United States Patent
Han et al.

(10) Patent No.: US 8,429,309 B2
(45) Date of Patent: Apr. 23, 2013

(54) METHOD AND SYSTEM FOR PROVIDING INPUT IN HOME NETWORK USING UPNP

(75) Inventors: Se-Hee Han, Seoul (KR); Joo-Yeol Lee, Seoul (KR); Dong-Shin Jung, Suwon-si (KR); Je-Young Maeng, Suwon-si (KR); Fei-Fei Feng, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 233 days.

(21) Appl. No.: 12/541,640

(22) Filed: Aug. 14, 2009

(65) Prior Publication Data

US 2010/0042233 A1  Feb. 18, 2010

(30) Foreign Application Priority Data

Aug. 14, 2008 (KR) .................. 10-2008-0080120
Jul. 27, 2009 (KR) .................. 10-2009-0068442

(51) Int. Cl.
*G06F 3/00* (2006.01)
*G06F 13/38* (2006.01)

(52) U.S. Cl.
USPC .................. 710/8; 710/10; 710/62; 709/223; 709/238

(58) Field of Classification Search .................. None
See application file for complete search history.

(56) References Cited

U.S. PATENT DOCUMENTS

| | | | |
|---|---|---|---|
| 7,664,899 B2 * | 2/2010 | Kimura .................. | 710/106 |
| 2003/0101294 A1 | 5/2003 | Saint-Hilaire et al. | |
| 2005/0097503 A1 * | 5/2005 | Zintel et al. .................. | 717/100 |
| 2005/0235334 A1 * | 10/2005 | Togashi et al. ............. | 725/117 |
| 2005/0240665 A1 * | 10/2005 | Gu et al. .................. | 709/220 |
| 2006/0031459 A1 | 2/2006 | Ahn et al. | |
| 2006/0136893 A1 * | 6/2006 | Blossom et al. ............. | 717/168 |
| 2007/0043550 A1 | 2/2007 | Tzruya | |
| 2007/0165787 A1 | 7/2007 | Kim et al. | |
| 2007/0192486 A1 * | 8/2007 | Wilson et al. .................. | 709/225 |
| 2008/0034081 A1 * | 2/2008 | Marshall et al. ............. | 709/223 |
| 2008/0098088 A1 * | 4/2008 | Tamano et al. ............. | 709/218 |
| 2008/0120422 A1 | 5/2008 | Park et al. | |
| 2008/0209034 A1 * | 8/2008 | Shin et al. .................. | 709/224 |
| 2009/0006686 A1 * | 1/2009 | Kimura .................. | 710/106 |
| 2009/0070840 A1 * | 3/2009 | Kamimaki et al. ........... | 725/114 |
| 2009/0161579 A1 * | 6/2009 | Saaranen et al. ............. | 370/254 |
| 2012/0079368 A1 | 3/2012 | Abdelaziz et al. | |

FOREIGN PATENT DOCUMENTS

| | | |
|---|---|---|
| JP | 2003-533766 | 11/2003 |
| JP | 2005-250867 | 9/2005 |
| JP | 2006-018719 | 1/2006 |
| KR | 100645171 | 11/2006 |
| KR | 100800998 | 2/2008 |
| KR | 100803610 | 2/2008 |
| KR | 100830940 | 5/2008 |
| WO | WO 01/86393 | 11/2001 |

* cited by examiner

*Primary Examiner* — Henry Tsai
*Assistant Examiner* — Michael Sun
(74) *Attorney, Agent, or Firm* — The Farrell Law Firm, P.C.

(57) ABSTRACT

A method is provided for providing input in a home network using Universal Plug and Play (UPnP). A control point sends a request for information about input capabilities to an electronic device existing in the home network, and receives the information about the input capabilities in response to the request. The control point sets an input client and an input server based on the received information about the input capabilities. The control point transmits input data received through the set input client to the set input server.

24 Claims, 10 Drawing Sheets

FIG.11B ically to the network. When the control point newly joins the network, the control point multicasts an SSDP Multicast-search (M-search) message to the network, and then all of the controlled devices, which checked the M-search message, send M-search response messages containing their own information to the control point.

METHOD AND SYSTEM FOR PROVIDING INPUT IN HOME NETWORK USING UPNP

PRIORITY

This application claims priority under 35 U.S.C. §119(a) to a Korean Patent Application filed in the Korean Intellectual Property Office on Aug. 14, 2008 and assigned Serial No. 10-2008-0080120, and a Korean Patent Application filed in the Korean Intellectual Property Office on Jul. 27, 2009 and assigned Serial No. 10-2009-0068442, the entire disclosure of each of which is hereby incorporated by reference.

BACKGROUND OF THE INVENTION

1. Field of the Invention

The present invention relates generally to a home network, and more particularly, to a method and system for providing input in a home network using Universal Plug and Play (UPnP), a home network middleware protocol.

2. Description of the Related Art

In general, a home network, which consists of Internet Protocol (IP)-based private networks, connects all types of various devices used in a home, such as Personal Computers (PCs), intelligent products and wireless devices, to one network through a common virtual computing environment called 'middleware', and controls the devices.

The term "middleware" refers to software for connecting various digital devices on a peer-to-peer basis and enabling communication between the devices. Various technologies, such as Home AV Interoperability (HAVI), Universal Plug and Play (UPnP) control device, Java Intelligent Network Infra-structure (Jini), and Home Wide Web (HWW), have been proposed as middleware.

Since the addition of a Plug and Play (PnP) function to the operating system, it has been very easy to install and set peripheral devices of PCs. UPnP, which has evolved from PnP, is a technology for enabling various home appliances and network devices such as network printers and Internet gates to perform networking, especially home networking, by extending such convenient functions to the entire network based on Internet standard technologies such as Transmission Control Protocol/Internet Protocol (TCP/IP), Hyper Text Transfer Protocol (HTTP), and eXtensible Markup Language (XML).

A UPnP network consists of a Controlled Device (CD), which is a device that is connected to and controlled by an IP-based home network, and a Control Point (CP) for controlling the controlled device. The UPnP network uses a UPnP protocol stack structure that includes Internet protocols such as TCP/IP and HTTP, and technologies such as XML and Simple Object Access Protocol (SOAP), and performs communication between the control point and the controlled device through the following general steps.

In a first step (or an addressing step), a control point and a controlled device have individual IP addresses. Upon joining the network, the controlled device fetches its IP address using a Dynamic Host Configuration Protocol (DHCP), or is assigned an IP address using automatic IP addressing if there is no DHCP server in the network.

In a second step (or a discovery step), the control point searches for the controlled device, or the controlled device advertises its location. The discovery step is performed using a Simple Service Discovery Protocol (SSDP). If the controlled device is added to the network, the controlled device delivers an SSDP alive message to the network by IP multicasting, and then the control point can determine the presence/absence of the controlled device by receiving the alive message. When the control point newly joins the network, the control point multicasts an SSDP Multicast-search (M-search) message to the network, and then all of the controlled devices, which checked the M-search message, send M-search response messages containing their own information to the control point.

In a third step (or a description step), the control point checks the description content of the controlled device. When the control point wants the controlled device after checking the response message, the control point may send to the controlled device a request for detailed information related to the controlled device, and then the controlled device, which has received the request, sends its information in an XML document.

In a fourth step (or a control step), the control point operates the controlled device by controlling a function of the controlled device. When the control point intends to control an arbitrary controlled device, the control point sends a desired service to the controlled device using SOAP, based on the detailed information related to the controlled device. SOAP is a protocol that is written on HTTP by XML for the purpose of calling a remote function.

In a fifth step (or an eventing step), the control point receives a change in the event of the controlled device. The control point sends a subscribe request for a relevant event to the controlled device when the control point desires to receive an event message from the controlled device. If the subscription is successful, the controlled device sends an event message to the control point using General Event Notification Architecture (GENA).

In a sixth step or a presentation step, the control point presents a state of the controlled device using a Hyper Text Markup Language (HTML) of the controlled device.

Figure 1:
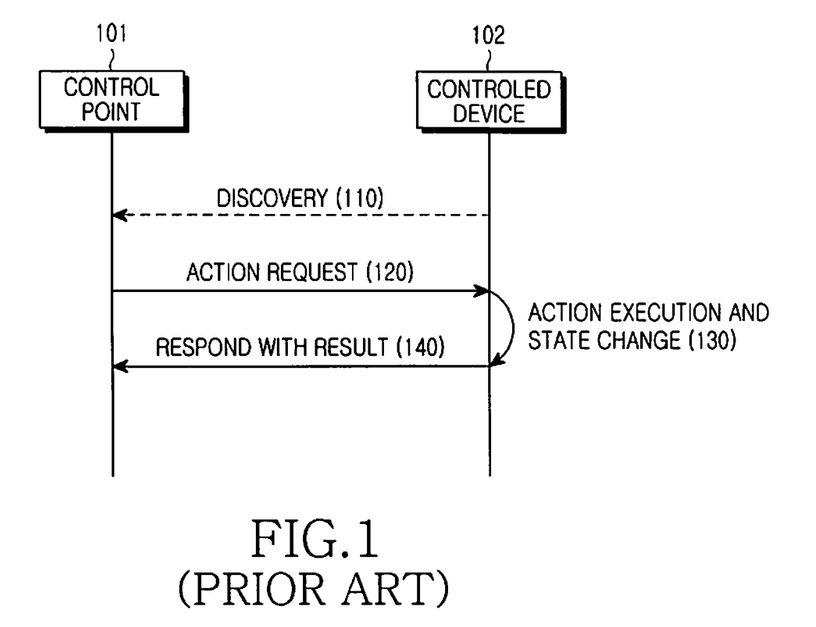
FIG. 1 is a flow diagram illustrating device discovery and action execution in a general network system using Universal Plug and Play (UPnP)

FIG. 1 illustrates device discovery and action execution in a general UPnP network system. Referring to FIG. 1, in step 110, a control point 101 discovers or searches for a controlled device 102, or the controlled device 102 advertises its location, performing the discovery step. In step 120, the control point 101 sends an action request to the controlled device 102. In step 130, the controlled device 102 performs an action corresponding to the received action request. In step 140, the controlled device 102 responds the control point 101 with the action result. To be specific, the controlled device 102 performs the requested action, and transmits the normal execution result for the action or an error message to the control point 101.

Based on the basic UPnP control method (UPnP device architecture), a UPnP controlled device can provide various services (i.e. functions) to the control point. For example, based on the basic UPnP control method, a UPnP control point can control the UPnP controlled device in which Audio/Visual (A/V) content is stored, so that the A/V content can be replayed in another UPnP controlled device that provides a rendering service. In the case where the UPnP controlled device is a gateway, the UPnP control point can change and set an IP address band and addresses of a subnet and a gateway, to be assigned to the devices in the home, by controlling the UPnP gateway, or the controlled device.

Meanwhile, in order to perform an input operation, a general electronic device uses an input means physically mounted in the device or peripheral input devices. Therefore, the input method is restricted by the types, hardware characteristics, and performances of the electronic device or its peripheral devices. For example, a cellular phone commonly includes a keypad or a touch screen as an input means, and a TeleVision (TV) set generally has an input means such as a remote controller. Recently, interactive services such as the Internet and home shopping are being provided over the TV. Therefore, when accessing the Internet on the TV, the user must inconveniently use the function-limited remote controller in order to search the Internet over the TV.

Therefore, there is a need for a way to provide an input means that is more proper to perform an input operation, in addition to the input means that the device basically provides.

SUMMARY OF THE INVENTION

An aspect of an embodiment of the present invention is to address at least the problems and/or disadvantages set forth above and to provide at least the advantages described below. Accordingly, an aspect of the present invention provides a method and system capable of providing other input modes that are more suitable to perform the current input operation, in addition to an input mode that a specific device basically provides, using an UPnP network.

Another aspect of the present invention provides an input data delivery method between a device providing an input mode and a device being provided with an input mode, and a method and system for allowing the device being provided with an input mode to automatically determine another input mode suitable for the current input scheme during execution of a specific input operation.

According to one aspect of the present invention, there is provided a method for providing input in a home network using Universal Plug and Play (UPnP), in which a control point sends a request for information about an input capability to an electronic device existing in the home network, and receives the information about the input capability in response to the request, the control point sets an input client and an input server based on the received information about input capability, and the control point transmits input data received through the set input client to the set input server.

According to another aspect of the present invention, there is provided a system for providing input in a home network using Universal Plug and Play (UPnP), in which a control point sends a request for information about an input capability to an electronic device existing in the home network, receives the information about the input capability in response to the request, and sets an input client and an input server based on the received information about the input capability, the input client transmits input data to the input server, and the input server receives and processes the input data from the input client.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a method and system for using an input means of another device available for the current input operation, in addition to a basically available input means, when an input operation occurs in a specific device using a Universal Plug and Play (UPnP) network. For this purpose, the present invention provides a series of action calling operations and a controlled device control method for providing input in an UPnP network, and a controlled device and a control point.

The present invention provides an input data transmission operation between a device requesting input (hereinafter "input server") and an input device (hereinafter "input client") in a UPnP network. A detailed description thereof will be given below with reference to accompanying drawings.

Figure 2:
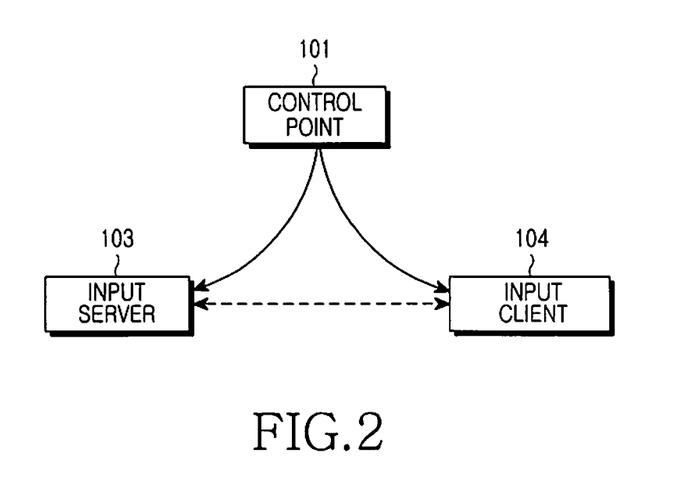
FIG. 2 is a block diagram of an UPnP input system according to an embodiment of the present invention.

FIG. 2 is a block diagram of a UPnP input system according to an embodiment of the present invention.

Referring to FIG. 2, an UPnP input system includes an input client 104 with which a user will actually perform an input operation, an input server 103 for receiving and processing input data from the input client 104, and a control point 101 for controlling the input client 104 and the input server 103.

Figure 3:
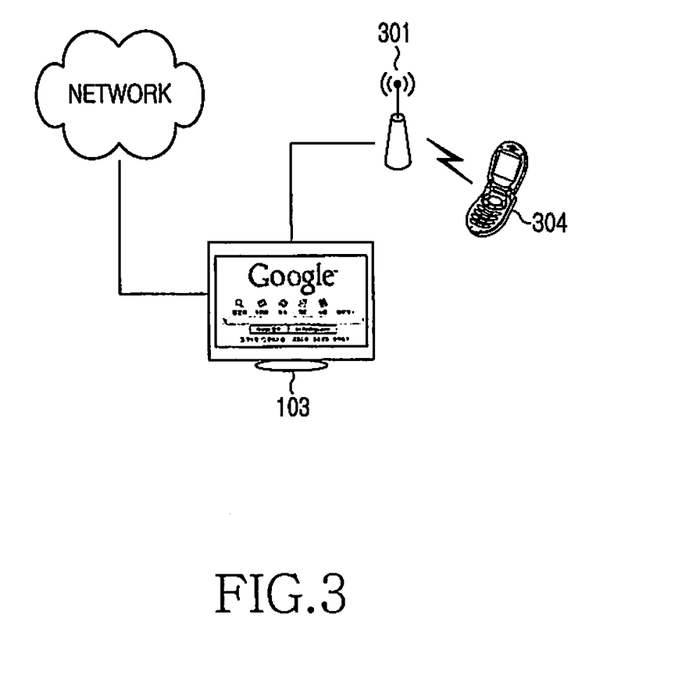
FIG. 3 illustrates respective devices in an UPnP input system according to an embodiment of the present invention.

FIG. 3 illustrates respective devices in a UPnP input system according to an embodiment of the present invention.

Referring to FIG. 3, as illustrated, an input client with which a user actually performs an input operation is realized with a mobile terminal 304, and an input server that receives input data from the input client is realized with an Internet TV 303. The mobile terminal 304 is connected to the Internet TV 303 through a control point 301 and a UPnP network. Though the control point 301 in FIG. 3 can be realized in a physical device, it can also be a logical structure like an application. Therefore, the control point 301 may be realized in the Internet TV 303 or the mobile terminal 304 in the form of an application.

The mobile terminal 304 or the Internet TV 303 can discover its counterpart device in the above system with use of a UPnP network. When a user needs to input while enjoying the Internet TV 303, the user can perform an input operation using an input mode of the mobile terminal 304, for example, a keypad, a touchpad, a virtual keyboard, a touch screen, etc., and transmit input data to the Internet TV 303. Accordingly, the present invention can reduce the inconvenience of an input operation of, for example, the Internet TV 303, which is caused by the function-limited input mode (e.g. remote controller).

Figure 4:
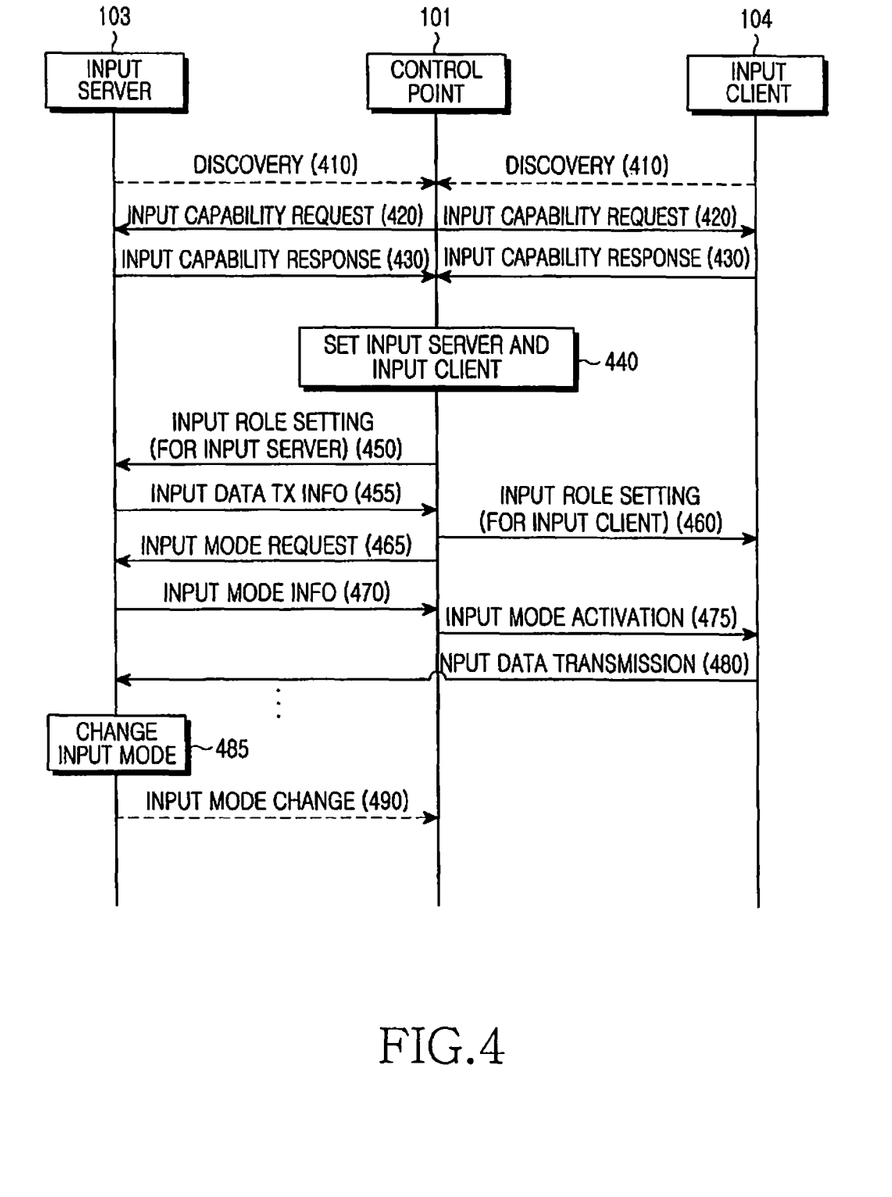
FIG. 4 is a flow diagram illustrating an UPnP input operation according to an embodiment of the present invention.

FIG. 4 illustrates a UPnP input operation according to an embodiment of the present invention. With reference to FIG. 4, a detailed description will be made of a message transmission/reception operation among an input server 103, a control point 101, and an input client 104 during a UPnP input operation according to an embodiment of the present invention.

In step 410, the control point 101 discovers UPnP devices existing in a network through a discovery operation on the UPnP network. In step 420, the control point 101 sends to the UPnP devices discovered in step 410 an input capability request 'GetInputDeviceCapabilities( )' to request information about supportable input modes of the discovered UPnP devices.

In step 430, the UPnP devices, which received the input capability information request, send to the control point 101 input capability responses. In this case, the input capability responses transmitted by the UPnP devices may include information given in Table 1 below. As illustrated in Table 1, the response information responsive to the input capability request includes information about an available role indicating whether a relevant device can serve as an input server or as an input client, and about an available input mode (e.g., a mouse, a keyboard, a touchpad, etc.). Preferably, a Universal Serial Bus (USB) Human Interface Device (HID) class can be used for the available input mode.

TABLE 1

```
<?xml version="1.0"encoding="UTF-8"?>
<InputDeviceCapabilities>
    <SupportUsageList role="server">
        <Page ID="01">
            <Name>Generic Desktop</Name>
            <Usage ID="02">Mouse</Usage>
            <Usage ID="06">Keyboard</Usage>
        </Page>
        <Page ID="0D">
            <Name>Digitizers</Name>
            <Usage ID="05">Touch Pad</Usage>
        </Page>
    </SupportUsageList>
    <SupportUsageList role="client">
        <Page ID="07">
            <Name>Keyboard/Keypad</Name>
            <Usage ID="4F">Keyboard RightArrow</Usage>
            <Usage ID="50">Keyboard LeftArrow</Usage>
            <Usage ID="51">Keyboard DownArrow</Usage>
            <Usage ID="52">Keyboard UpArrow</Usage>
        </Page>
    </SupportUsageList>
<InputDeviceCapabilities>
```

The control point 101 can acquire information about an input mode that the relevant device can provide, from the feedback information illustrated in Table 1.

In step 440, the control point 101 determines an input server and an input client based on the input mode information received in step 430. When using a scheme of delivering input data after encoding the data, the control point 101 can determine even an encoding scheme of the input data in step 440.

In step 450, the control point 101 delivers to the UPnP device that will operate as an input server, input role setting information 'SetInputDeviceRole(profile)' for setting the input server 103 determined in step 440. The input role setting information may include set parameters such as a data format of input data and protocol information for transmitting input data.

In step 455, the input server 103, which received the input role setting information, delivers to the control point 101 an Identifier (ID) of a session for transmitting input data and information on a network port for receiving input data, in response thereto.

The control point 101 receives from the input server 103 the session ID and the network port information of the input server 103 that will receive input data, and delivers input role setting information 'SetInputDeviceRole( )' to the input client 104 in step 460. The information 'SetInputDeviceRole( )' includes the session ID, the network port information, data format information, and protocol information for transmitting input data. In this manner, the input client 104 can acquire information (e.g., data format, transmission protocol information, network port information, etc.) about the input server 103 to which it will transmit input data, and can manage the same session ID as the session ID managed by the input server 103.

In step 465, the control point 101 delivers to the input server 103 an input mode request 'RequestCurrentInputUsage( )' to determine which input mode the input client 104 will use. In step 470, the input server 103 delivers to the control point 101 the input server 103 input mode information in response to the input mode request.

In step 475, the control point 101 sends to the input client 104 a request for input mode activation 'ActivateInputUsage (ProfileID, CurrentUsage, Port)' using the input mode information. The input mode activation message may include profile ID information, current input mode information, and port information for transmitting input data.

In step 480, the input client 104 delivers to the input server 103 input data using an out-of-band protocol. In this case, the input server 103 may also deliver data to the input client 104 (not shown). Also, step 480 may be set to be initiated by a transmission start message from the control point 101. The out-of-band protocol indicates a communication protocol other than a UPnP protocol. In step 480, input data may be delivered using a UPnP control scheme. The input data delivery in step 480 may be performed using a USB HID report descriptor.

During the input data transmission, if the input mode is changed in step 485 because of, for example, a change in a User Interface (UI) of an application running in the input server 103, the input server 103 sends an input mode change event message (GENA Event message) to the control point 101 using a UPnP Eventing mechanism in step 490.

Thereafter, the control point 101 performs input data transmission/reception using the changed input mode by repeating steps 465 to 480. To be more specific, upon receipt of the input mode change event message, the control point 101 acquires from the input server 103 the changed input mode information by repeating steps 465 to 470. The acquired input mode information includes a session ID, when the previously used input mode exists therein. Next, step 475 is repeated, and an input mode activation message for activating a new input mode according to the changed input mode may include the acquired session ID. In this case, the control point 101 activates an input mode of the input client 104, which is used in the session, and creates a new session when the session ID is invalid. That is, the control point 101 performs input role setting on the input client 104 by repeating step 460, and then repeats steps 465 to 480.

If the input mode change in step 485 occurs not in the input server 103 but in the input client 104, the input client 104 delivers to the control point 101 an input mode change event message, and the control point 101 receives input mode information of the input client 104 and activates an input mode of the input server 103 according to the changed input mode of the input client 104 (not shown).

If the input operation is fully completed, the control point 101 ends the input operation by sending an input data stop request 'StopInputData( )' to the input client 104 (not shown).

In the operation described in FIG. 4, the control point 101 individually sets the input server 103 and the input client 104 by receiving input capabilities of UPnP devices discovered in the network, and then performs an input operation. However, in a scenario where a specific UPnP device has been previously set to serve as the input server 103, the control point 101 can perform an input operation by setting a UPnP device that will serve as the input client 104. In contrast, in a scenario where a specific UPnP device has been previously set to serve as the input client 104, the control point 101 can perform an input operation by setting a UPnP device that will serve as the input server 103.

Although the control point 101 is constructed independently of the input server 103 and the input client 104 in FIG. 4, any one of the input server 103 and the input client 104 can operate as a control point as well. Exemplary UPnP input operations for such cases are illustrated in FIGS. 5 and 6.

Figure 5:
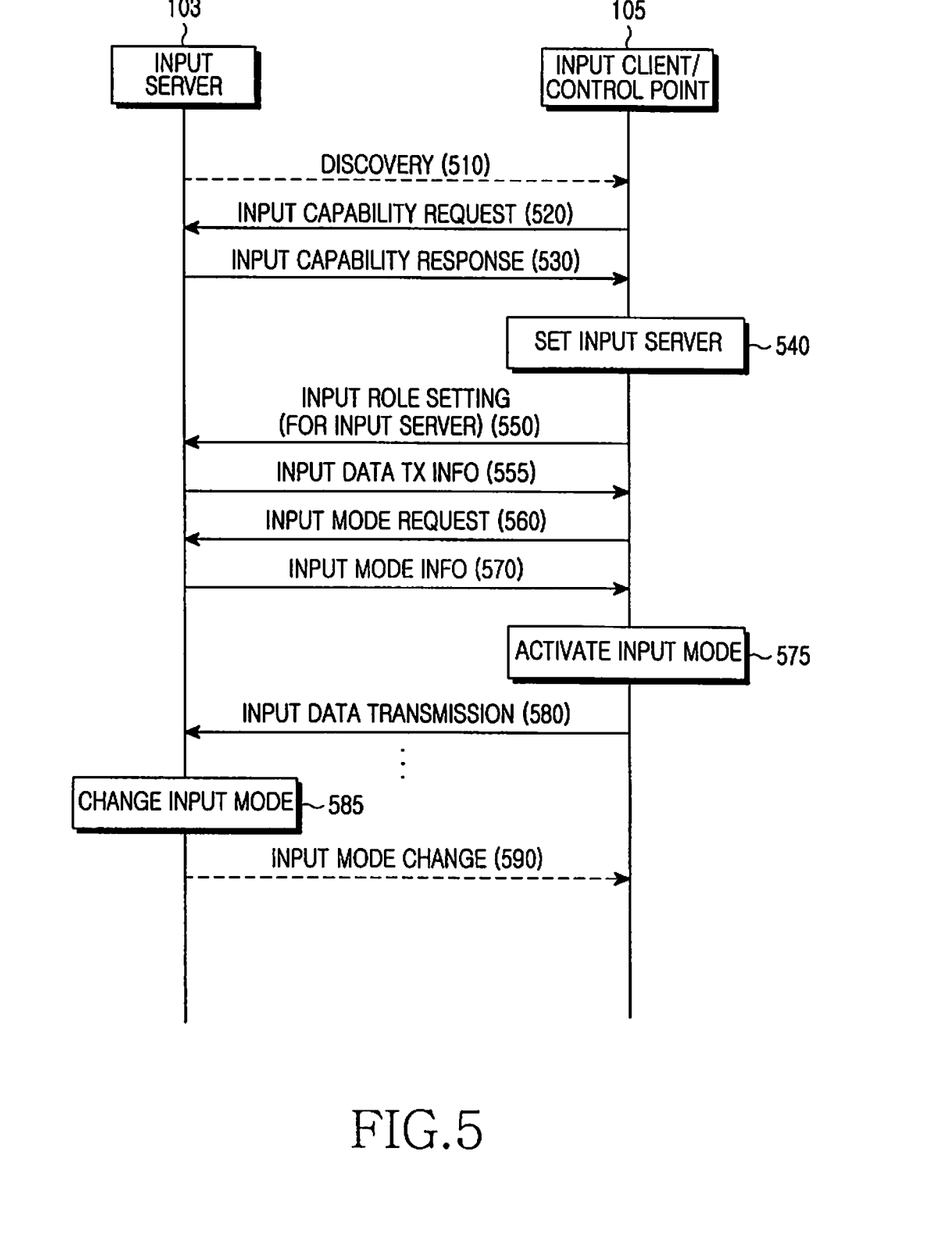
FIG. 5 is a flow diagram illustration an UPnP input operation according to another embodiment of the present invention.
Figure 6:
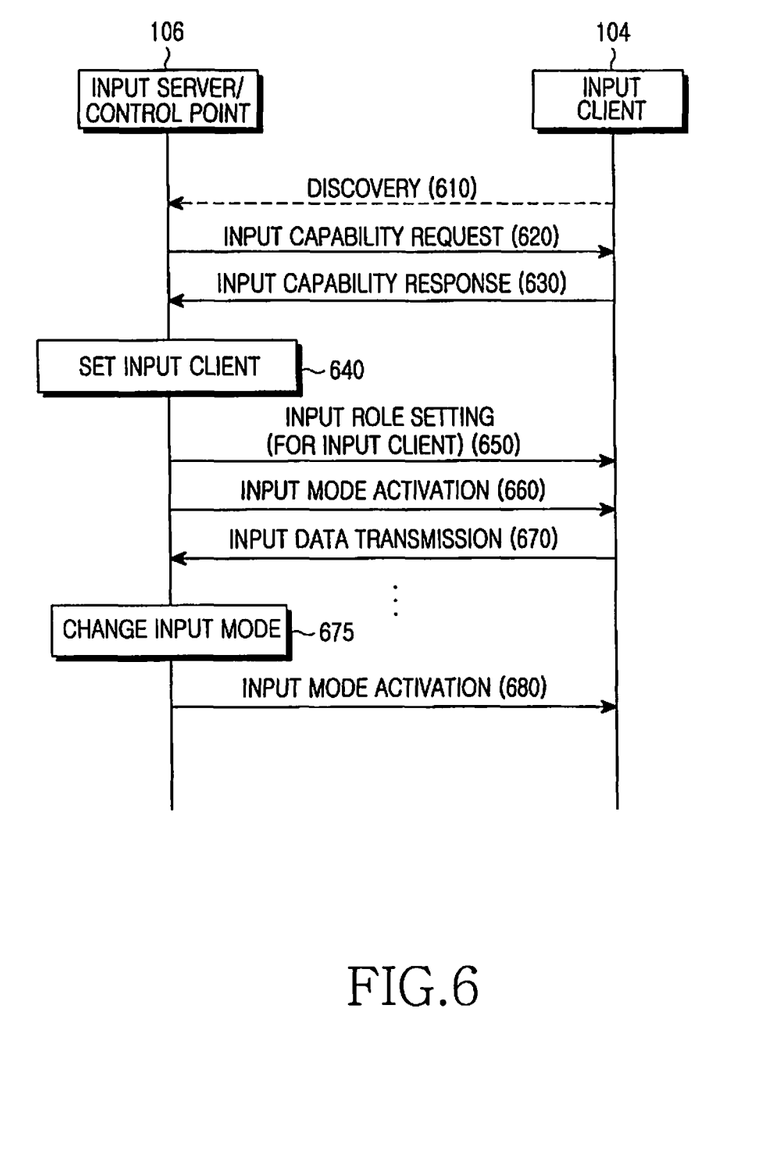
FIG. 6 is a flow diagram illustrating an UPnP input operation according to a further another embodiment of the present invention.

FIG. 5 illustrates a UPnP input operation according to another embodiment of the present invention. In an exemplary input operation illustrated in FIG. 5, an input client serves as a control point.

As illustrated in FIG. 5, because an input client serves as a control point, the input client searches for a device that requests input in a UPnP network, i.e. an input server 103 to which it will transmit input data, and transmits input data thereto.

Referring to FIG. 5, in step 510, an input client/control point 105 discovers a UPnP device existing in a network through a discovery operation on the UPnP network. In step 520, the input client/control point 105 sends to the discovered UPnP device an input capability request 'GetInputDeviceCapabilities( )' for requesting information about an input mode supportable by the UPnP device discovered in step 510 in order to select the input server 103.

In step 530, the UPnP device, which received the input capability information request, sends to the input client/control point 105 an input capability response. In this case, the input capability request sent by the UPnP device may include the information given in Table 1. As illustrated in Table 1, the response information responsive to the input capability request includes information about an available role indicating whether a relevant device can serve as an input server or as an input client, and about an available input mode (e.g., a mouse, a keyboard, a touchpad, etc.). Preferably, a USB HID class can be used for the available input mode.

The input client/control point 105 can acquire information about an input mode that the relevant device can provide, from the feedback information illustrated in Table 1.

In step 540, the input client/control point 105 determines an input server using the input mode information received in step 530. When using a scheme of delivering input data after encoding the data, the input client/control point 105 can determine even an encoding scheme of the input data in step 540.

In step 550, the input client/control point 105 delivers to the UPnP device that will operate as an input server input role setting information 'SetInputDeviceRole( )' for setting the input server 103 determined in step 540. The input role setting information may include set parameters such as a data format of input data and protocol information for transmitting input data.

In step 555, the input server 103, which received the input role setting information, delivers, to the input client/control point 105 an ID of a session for transmitting input data and network port information for receiving input data in response thereto.

In step 560, the input client/control point 105 sends to the input server 103 an input mode request 'RequestCurrentInputUsage( )' to determine which input mode the input client control point 105 will use. In step 570, the input client/control point 105 receives input mode information of the input server 103 in response to the input mode request.

In step 575, the input client/control point 105 activates an input mode of the input client/control point 105, which corresponds to the input mode of the input server 103, taking into account the input mode information and the ongoing application. The input mode activation in step 575, which is an internal operation, is performed using 'ActivateInputUsage( )'.

In step 580, the input client/control point 105 delivers to the input server 103 input data using an out-of-band protocol. In this case, the input server 103 may also deliver data to the input client/control point 105 (not shown). The out-of-band protocol indicates a communication protocol other than a UPnP protocol. In step 580, input data may be delivered using a UPnP control scheme. The input data delivery in step 580 may be performed using a USB HID report descriptor.

During the input data transmission, if the input mode is changed in step 585 because of, for example, a change in a UI of an application running in the input server 103, the input server 103 sends to the input client/control point 105 an input mode change event message (GENA Event message) using a UPnP Eventing mechanism in step 590.

Upon receipt of the input mode change event message, the input client/control point 105 repeats steps 560 to 580. That is, the input client/control point 105 acquires the changed input mode information by sending a request for an input mode to the input server 103, and performs input data transmission with the changed input mode by performing input mode activation.

If the input mode change in step 585 occurs in the input client/control point 105, the input client/control point 105 activates an input mode of the input server 103 according to the changed input mode of the input client/control point 105 (not shown).

In another embodiment of the present invention, because the input client serves as a control point, the control point has no need to transmit an input data stop request to the input client, and this operation can be internally controlled.

FIG. 6 illustrates a UPnP input operation according to a further embodiment of the present invention. In an exemplary input operation illustrated in FIG. 6, an input server serves as a control point.

As illustrated in FIG. 6, an input server/control point 106 searches for a necessary input device, i.e., an input client 104, from among available devices existing in a UPnP network, and receives input data from the input device.

In step 610, the input server/control point 106 discovers a UPnP device existing in a network through a discovery operation on the UPnP network. In step 620, the input server/control point 106 sends to the discovered UPnP device an input capability request 'GetInputDeviceCapabilities( )' for requesting information about an input mode supportable by the UPnP device discovered in step 610 in order to select an input client.

In step 630, the UPnP device, which received the input capability information request, sends to the input server/control point 106 an input capability response. In this case, the response to the input capability request sent by the UPnP device may include the information given in Table 1. As illustrated in Table 1, the response information responsive to the input capability request includes information about an available role indicating whether a relevant device can serve as an input server or as an input client, and about an available input mode (mouse, keyboard, touchpad, etc.). Preferably, a USB HID class can be used for the available input mode.

The input server/control point 106 can acquire information about an input mode that the UPnP device can provide, from the feedback information illustrated in Table 1.

In step 640, the input server/control point 106 determines an input client using the input mode information received in step 630. When using a scheme of delivering input data after encoding the data, the input server/control point 106 can determine even an encoding scheme of the input data in step 640.

In step 650, the input server/control point 106 sets the input client 104 by delivering input role setting information 'SetInputDeviceRole( )' for setting the input client to the UPnP device that will operate as an input client. The input role setting information may include a session ID, network port information of the input server/control point 106 that will receive input data, data format information, and protocol information for transmitting input data.

In step 660, the input server/control point 106 determines an input mode necessary for performing the current input operation taking into account the ongoing application, and sends to the input client 104 a request for input mode activation 'ActivateInputUsage(ProfileID, CurrentUsage, Port)'. The input mode activation message may include profile ID information, current input mode information, and port information for transmitting input data.

In step 670, the input client 104 delivers to the input server/control point 106 input data using an out-of-band protocol. In this case, the input server/control point 106 can also deliver data to the input client 104 (not shown). The out-of-band protocol indicates a communication protocol other than a UPnP protocol. In step 670, input data may be delivered using a UPnP control scheme. The input data delivery in step 670 may be performed using a USB HID report descriptor.

During the input data transmission, if the input mode is changed in step 675 because of, for example, a change in a UI of an application running in the input server/control point 106, the input server/control point 106 activates an input mode of the input client 104 according to the changed input mode and then transmits input data using the changed input mode in step 680.

By contrast, if the input mode change in step 675 occurs in the input client 104 during the input data transmission, the input client 104 sends an input mode change event message (GENA Event message) to the input server/control point 106 using an UPnP Eventing mechanism, and the input server/control point 106 acquires from the input client 104 the changed input mode information, activates its input mode according to the changed input mode of the input client 104, and transmits input data.

Using the operation described in FIG. 6, the input client that actually performs an input operation can provide an input service by discovering an input server that will receive input data. In addition, regarding the type of an input mode of each UPnP device and the input data transmission, the extensibility can be improved by reusing the existing USB HID class and USB HID report descriptor.

Figure 7:
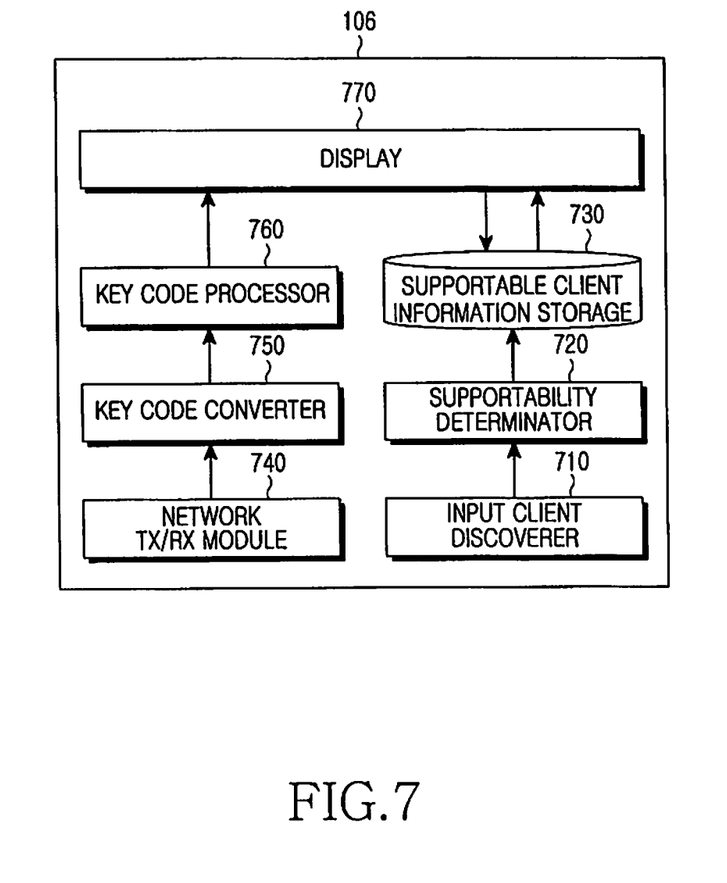
FIG. 7 is a block diagram of an input server serving as a control point as well in an UPnP input system according to a further embodiment of the present invention.

FIG. 7 is a block diagram of an input server that operates as a control point in a UPnP input system according to a further embodiment of the present invention. The input server/control point 106 according to a further embodiment of the present invention includes a display 770, a supportable client (or device) information storage 730, a supportability determinator 720, an input client (or device) discoverer 710, a network transmission/reception module 740, a key code converter 750, and a key code processor 760.

The input client discoverer 710 discovers a UPnP input device existing in a UPnP network. The input client discoverer 710 delivers information about the input device discovered in the network to the supportability determinator 720.

The supportability determinator 720 determines an available role, an available input mode, and Unicode supportability from the input device discovered by the input client discoverer 710. The supportability determinator 720 analyzes lists of available roles and available input modes to determine if they are available for the current input operation. Further, the supportability determinator 720 analyzes information about input capabilities (e.g. input mode, available role, etc.) of the discovered input device, and sets an input client based on the analyzed input capability information. When a control point and an input server are constructed independently, the supportability determinator 720 also sets the input server based on the analyzed input capability information.

The supportable client information storage 730 stores information about input capabilities of supportable input devices. In the input server/control point 106 according to an embodiment of the present invention, the supportability determinator 720 stores, in the supportable client information storage 730, information about the input devices determined to be available in the input server/control point 106.

The display 770 displays a user interface such as a screen requiring input, during an input request operation. When outputting information about an input client 104 that can provide input to the input server/control point 106, the display 770 can display the information by querying from the supportable client information storage 730. If a user selects any one of input clients displayed on the user interface, the input server/control point 106 informs the input client 104 that the client 104 is set as an input client, and then the input client device can enable the user to easily select a device through a means (e.g., sound, LED on/off, etc.) that the user can perceive (not shown).

The network transmission/reception module 740 transmits/receives input data using a UPnP network or other communication protocol. In an embodiment of the present invention, the network transmission/reception module 740 receives input data transmitted from the input client 104.

The key code converter 750 converts a transmitted format into a key code format that the input server/control point 106 can use, by analyzing the input data received through the network transmission/reception module 740.

The key code processor 760 processes input data by receiving a key code from the key code converter 750.

The input server/control point 106 can be constructed as above. If a control point 101 is constructed separately, the control point 101 may include the input client discoverer 710, the supportability determinator 720, the supportable client information storage 730, and the display 770. In this case, an input server 103 may include the network transmission/reception module 740, the key code converter 750, the key code processor 760, and the display 770.

Figure 8:
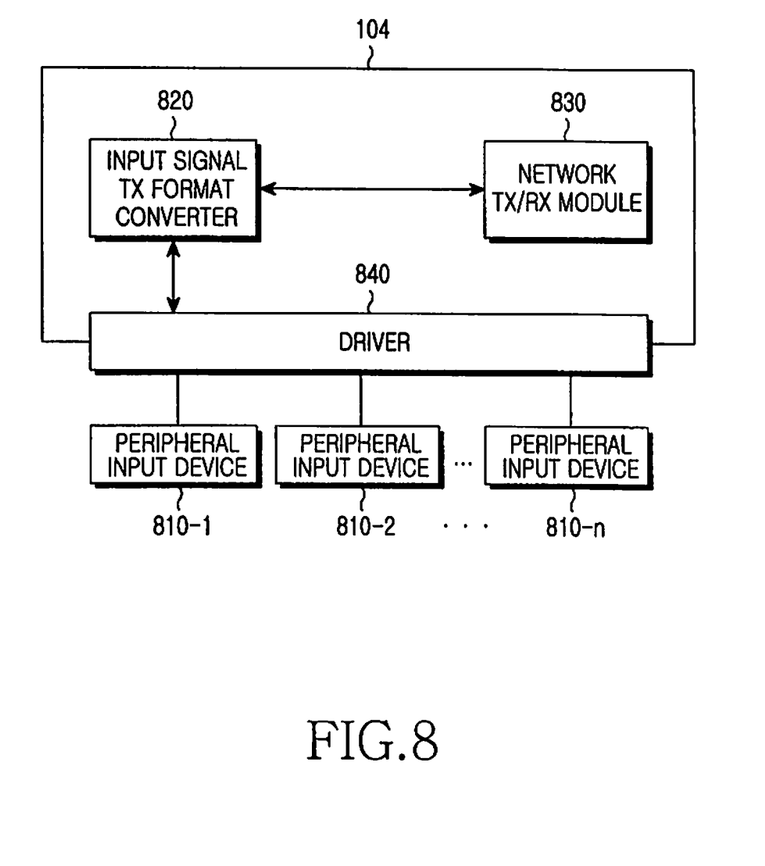
FIG. 8 is a block diagram of an input client in an UPnP input system according to an embodiment of the present invention.

FIG. 8 is a block diagram of an input client in a UPnP input system according to an embodiment of the present invention. An input client 104 includes a network transmission/reception module 830, an input signal transmission format converter 820, a driver 840, and a plurality of peripheral input devices 810-1 to 810-n.

The input client 104 may perform an input operation alone by installing the network transmission/reception module 830 and a UPnP device stack (not shown) in it, and may also perform an input operation with at least one input mode through the peripheral input devices 810-1 to 810-n connected to the network system.

For this purpose, the input client 104 includes the input signal transmission format converter 820 for converting an input signal received through an input mode into a format to be transmitted to the network, and the network transmission/reception module 830 for transmitting the data converted into the transmission format, to an input server device.

Figure 9:
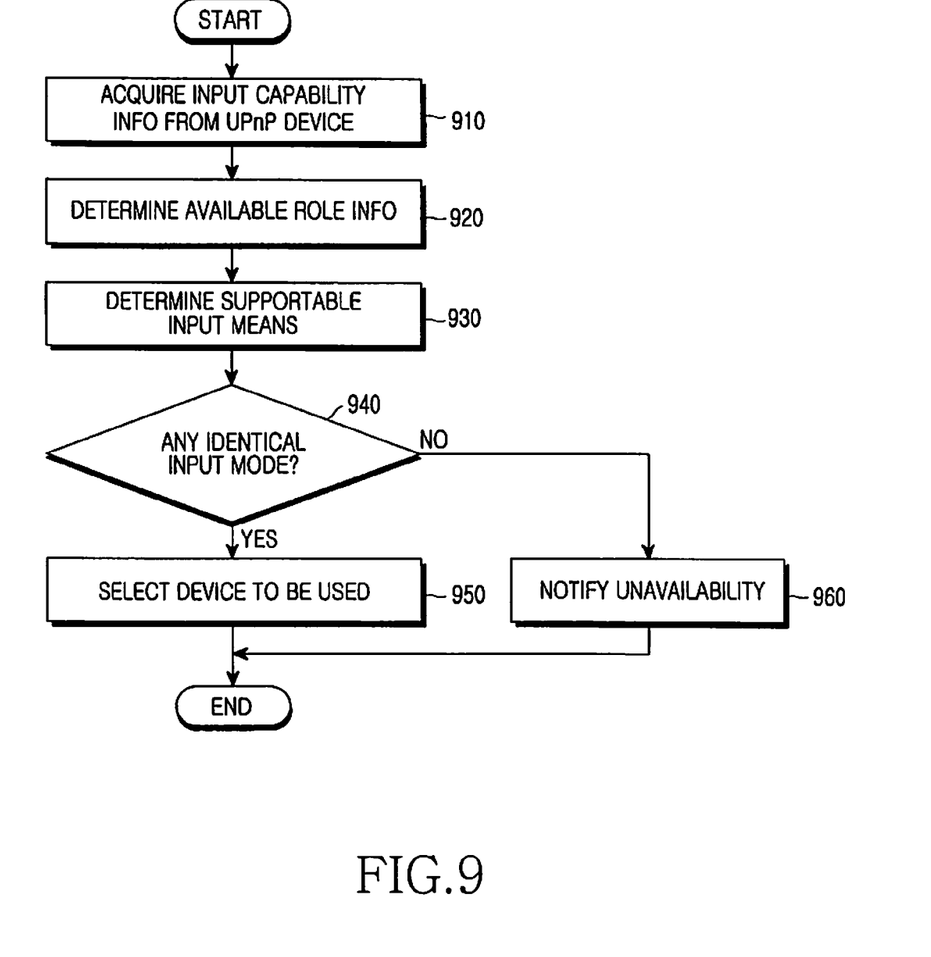
FIG. 9 is a flowchart illustrating an operation of a control point during an UPnP input operation according to an embodiment of the present invention.

FIG. 9 illustrates a UPnP input operation in a control point according to an embodiment of the present invention. In the process illustrated in FIG. 9, a control point determines a role of each input device and selects an input device to be used.

In step 910, a control point 101 acquires input capability information from UPnP devices existing in the network. In step 920, the control point 101 determines an available role of each UPnP device, referring to the information acquired in step 910 and the UPnP device information acquired through a UPnP discovery operation. In step 930, the control point 101 analyzes supportable input mode information of each UPnP device. Here, a USB HID class may be used as the supportable input mode information. More specifically, the control point 101 analyzes supportable input mode information of a UPnP device capable of serving as an input client, when an input server is previously set, and analyzes supportable input mode information of a UPnP device capable of serving as an input server, when an input client is previously set.

In step 940, the control point 101 determines if there is any identical input mode among supportable input modes of an input server and supportable input modes of an input client. That is, when an input server is set, the control point 101 determines if any one of the supportable input modes of a UPnP device capable of serving as an input client is identical to a supportable input mode of the currently set input server. When an input client is set, the control point 101 determines if any one of the supportable input modes of a UPnP device capable of serving as an input server is identical to a supportable input mode of the currently set input client. If there is an identical input mode in step 940, the control point 101 allows the user to select an input device to be used, by displaying the identical input mode in step 950.

In other words, when an input server is set, the control point 101 collects supportable input modes of electronic devices capable of operating as an input client, and sets as an input client at least one of the electronic devices capable of operating as an input client, which includes information about a supportable input mode identical to an input mode supportable in the input server. When an input client is set, the control point 101 collects the supportable input modes of the electronic devices capable of serving as an input server, and sets as an input server at least one of electronic devices capable of operating as an input server, which includes information about a supportable input mode identical to an input mode supportable in the input client.

If there is no identical input mode in step 940, the control point 101 informs that it is not possible to input information using the current input device, in step 960.

Figure 10:
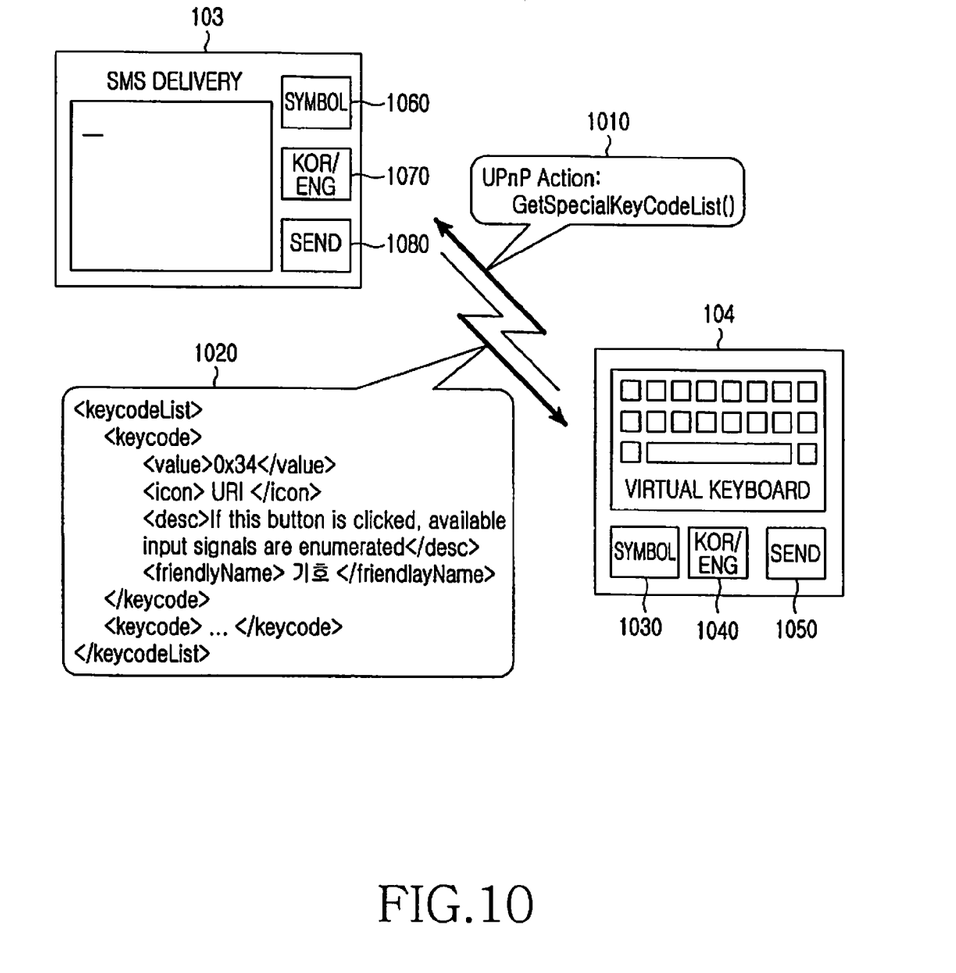
FIG. 10 illustrates information that an input client uses to provide special keys or additional buttons during an UPnP input operation according to an embodiment of the present invention.

FIG. 10 illustrates information that an input client uses to provide special keys or additional buttons during a UPnP input operation according to an embodiment of the present invention. A method illustrated in FIG. 10 is for providing special keys or additional buttons 1060, 1070 and 1080 of an input server 103 to an input client 104 during a UPnP input operation according to an embodiment of the present invention.

In FIG. 10, an input device with a virtual keyboard formed on a touch screen is shown as an example of the input client 104. The input client 104 can send to the input server 103 an action 'GetSpecialKeyCodeList( )' 1010 requesting a special key code list to provide a user with special keys or additional buttons in addition to the virtual keyboard.

In response to the request, the input server 103 provides a key code list 1020, which is mapped to special keys or additional buttons 1060, 1070 and 1080 that the input server 103 can provide. Respective key codes belonging to the key code list 1020 may include not only key code values but also information (icons, friendly names, descriptions, etc.) that the user can recognize. Further, information on applications running in the input server 103 can also be included.

Upon receipt of the key code list information 1020, the input client 104 can provide special keys or additional buttons to the user, together with their identification information included in the key code list information 1020. Then the user can anticipate the functions which are to be performed when the user pushes special keys or additional buttons at the sight of the identification information displayed on the special keys or additional buttons.

The input client 104 only needs to transmit to the input server 103 key code values associated with selected keys without the need to comprehend meanings of the key values.

When the input client 104 is a device that can hardly add and display special keys or additional buttons in a software way, or an input device that provides only hardware buttons, the same effects as above can be obtained by providing a component that maps key code values assigned to the existing buttons of the input client 104 to the key code values provided by the input server 103. In this case, on the client device, user intervention is needed for mapping between the existing keys and the key codes provided by the input server.

In the general input method using key codes, the input client 104 and the input server 103 must have the values which are mapped to the previously agreed key code values. However, according to the present invention, the input client 104 can use any key code values that the input server 103 provides in a one-sided manner, thus contributing to expanding functions of the input client 104.

Further, in the conventional manual key code mapping method, the input server 103 receives an input key code value while waiting for key input from the input client 104, and selects a function of the input server 103, which is to be mapped to the key code value. However, the input server 103 according to the present invention can use device-specific key code values regardless of key code vales from the input client 104.

Figure 11A:
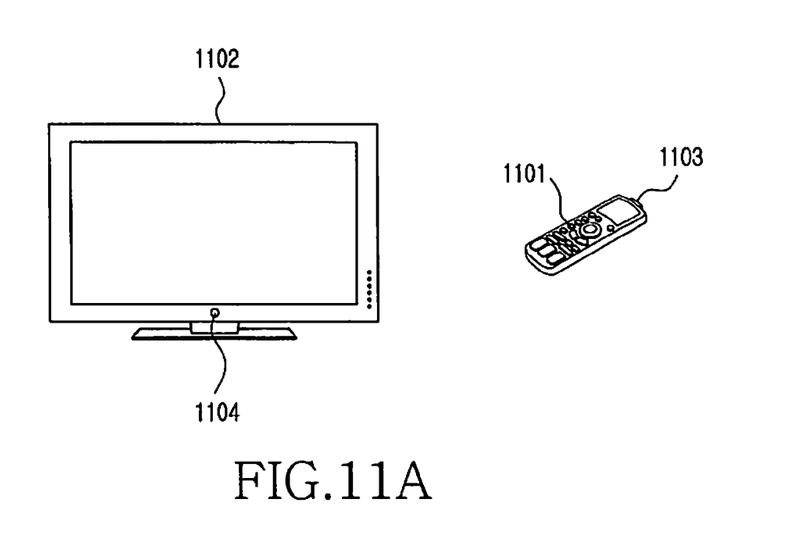
FIGS. 11A and 11B illustrate an example where an UPnP input operation is performed using a universal remote controller as an input client according to an embodiment of the present invention.
Figure 11B:
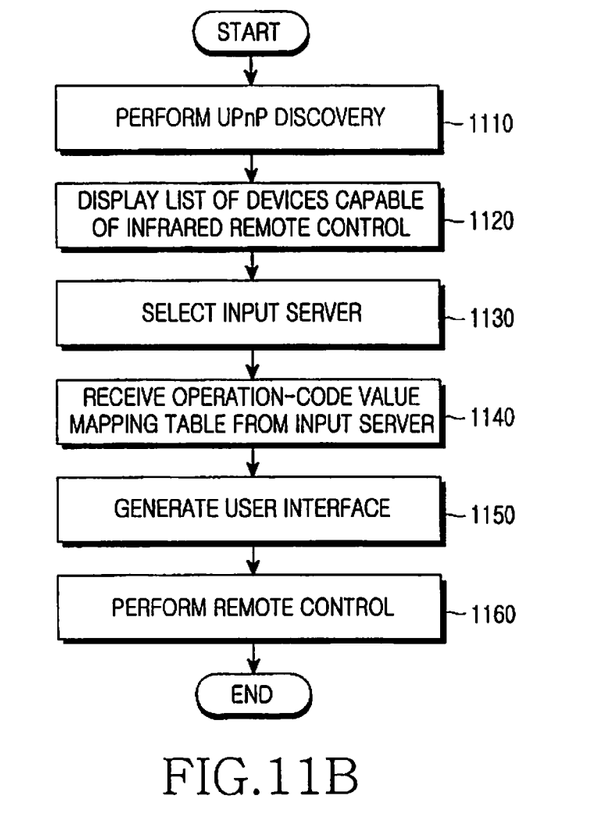

FIGS. 11A and 11B illustrate an example where a UPnP input operation is performed using a universal remote controller as an input client according to an embodiment of the present invention. Referring to FIG. 11A, an input server (e.g., TV) 1102 and an input client (e.g., remote controller) 1101 each have an interface for infrared remote control. The input server 1102 has an infrared receiver 1104 mounted in it, while the input client 1101 has an infrared transmitter 1103 installed therein. Commonly, in a remote control device, specific codes are mapped to buttons on the remote control device, and when a user pushes a button, a signal associated with a code mapped thereto is transmitted through an infrared transmitter in the remote control device. A target device (i.e., input server) located in the remote place receives the signal through the infrared receiver 1104 and performs a specific operation mapped to a code value indicated by the received signal. During an input operation illustrated in FIG. 11A, the infrared remote controller serves as a UPnP control point.

Referring to FIG. 11B, in step 1110, the input client 1101 discovers the input server 1102 and acquires information about a supportable input mode of the input server 1102. Accordingly, the input client 1101 can create a list of infrared remote controllable devices existing in the network. In step 1120, the input client 1101 displays the list of infrared remote controllable devices on a user interface. In step 1130, the infrared remote controller, or the input client 1101, receives from a user an input of selecting a device the user desires to control, i.e., an input server.

In step 1140, the input client 1101 receives operation-code value mapping table information from the input server 1102 by calling a SOAP Action (e.g., GetMappingCodeTable( )). The mapping table information may include universal operation-code value combinations of the remote control device, and may also include device-specific operation-code value combinations. Items regarding the device-specific operation-code value combinations may be assigned names the user can identify, or additional descriptions thereof. Besides, image icon information, based on which the user can suppose operations from images, can also be provided together.

The input client 1101 creates a remote controller's user interface based on the information in step 1150, and performs a remote control operation in step 1160.

Through the foregoing operation, the remote control device 1101 can dynamically complete the necessary setting regardless of the manufacturer, type and control code of the control-target device 1102, and operate as a remote controller of the control-target device 1102.

As is apparent from the foregoing description, according to embodiments of the present invention, when there are no or limited input modes that a specific device basically provides using a UPnP network, the device can use input modes of other devices, which are more suitable to perform the current input operation, in addition to the basic input means.

In addition, a device being provided with input modes can automatically determine another input mode suitable for the current input scheme during execution of a specific input operation.

The present invention can perform an input operation using various peripheral input devices existing in the network without the need to provide various peripheral input devices which are physically connected for the input operation. The user can deliver input data by selecting one of the input-requesting devices which are automatically discovered through the network, without the need to physically connect a desired input device to an input-requesting device.

In addition, according to the present invention, an input client that actually performs an input operation can provide an input service by discovering an input server that will receive input data, and regarding the types of input modes and the input data transmission, the extensibility can be improved by using a USB HID class and a report descriptor.

Moreover, the present invention can dynamically activate a proper input device according to a change in the input UI's state of an application performing an input operation, contributing to improving user convenience.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While an operation and configuration of a method and system for providing input in a UPnP home network has been shown and described with reference to certain exemplary embodiments of the present invention, it will be understood by those skilled in the art that various changes in form and details may be made therein without departing from the spirit and scope of the invention as defined by the appended claims and their equivalents.

What is claimed is:

1. A method for providing input in a home network using Universal Plug and Play (UPnP), comprising:
    sending, by a control point to an electronic device existing in the home network after completion of a discovery operation with respect to the electronic device, a request for information about user interface input capabilities, and receiving the information about the user interface input capabilities in response to the request;
    setting, by the control point, an input client and an input server based on the received information about the user interface input capabilities; and
    transmitting, by the control point, input data received through the set input client to the set input server,
    wherein the information about the user interface input capabilities includes information about an available input mode representing a type of input means equipped with the input client and information about an available role of the electronic device indicating whether the electronic device is available as an input server or an input client.

2. The method of claim 1, wherein the information about the available input mode includes a Universal Serial Bus (USB) Human Interface Device (HID) class.

3. The method of claim 1, wherein setting the input client and the input server comprises:
    determining available role information of the electronic device based on the received information about user interface the input capabilities;
    setting an input server or an input client;
    when the input server is set, collecting a supportable input mode of an electronic device configured for operating as an input client, and setting as an input client at least one of the electronic devices configured for operating as an input client, which includes information about a supportable input mode identical to an input mode supportable in the input server; and when the input client is set, collecting a supportable input mode of an electronic device configured for operating as an input server, and setting as an input server at least one of the electronic devices configured for operating as an input server, which includes information about a supportable input mode identical to an input mode supportable in the input client.

4. The method of claim 1, wherein setting the input client and the input server comprises:

setting an input server by performing an action for setting an input role, in which a data format of input data and transmission protocol information are included;

receiving, from the set input server a response message including an identifier (ID) of a session for transmitting input data and port information of a network for receiving the input data; and setting an input client by setting an input role that includes the ID of a session for transmitting the input data, the port information of a network for receiving the input data, protocol information for transmitting the input data, and information about a data format of the input data.

5. The method of claim 1, wherein transmitting the received input data comprises:

sending to the input server, an input mode request for requesting information about an input mode to be used during an input operation;

receiving, from the input server, input mode information of the input server to the control point in response to the input mode request;

activating an input mode of the input client based on the input mode information from the input server; and receiving input data with the activated input mode, and transmitting the received input data to the input server.

6. The method of claim 1, further comprising:

receiving, by the control point, information about a changed input mode, when a current input mode is changed in the input server or the input client;

acquiring, by the control point, the changed input mode information from the device whose input mode is changed; and activating, by the control point, an input mode of a counterpart device of the device whose input mode is changed according to the acquired changed input mode information.

7. The method of claim 1, wherein during activation of an input mode of a counterpart device, if there is a previously used session Identifier (ID), an input mode assigned the session ID is activated.

8. The method of claim 1, wherein the transmission of the input data received through the set input client to the set input server is initiated by an input data transmission request from the control point.

9. The method of claim 1, wherein the transmission of the input data received through the set input client to the set input server includes transmitting input data received through the set input client to the set input server using at least one of a UPnP protocol and a communication protocol other the UPnP protocol.

10. The method of claim 1, wherein the input data received through the input client includes at least one of a preset data format, a Universal Serial Bus (USB) report descriptor, and a hexadecimal InfraRed (IR) code value.

11. A control point for providing input in a home network using Universal Plug and Play (UPnP), comprising:

an input device discoverer for performing a UPnP discovery operation to search for an input device existing in a UPnP network;

a supportability determinator for receiving the information about user interface input capabilities of a discovered input device, and setting an input client and an input server based on the received information about the user interface input capabilities;

a supportable device information storage for storing information about the user interface input capabilities of an input device available for the input server; and a display for displaying information about an input client available for the input server, wherein the information about the user interface input capabilities includes information about an available input mode representing a type of input means equipped with the input client and information about an available role of the electronic device indicating whether the electronic device is available as an input server or an input client.

12. The control point of claim 11, wherein the information about the available input mode includes a Universal Serial Bus (USB) Human Interface Device (HID) class.

13. The control point of claim 11, wherein the control point determines available role information of the electronic device based on the received information about the user interface input capabilities, and setting an input server or an input client, wherein, when the input server is set, the control point collects a supportable input mode of an electronic device configured for operating as an input client, and set as an input client at least one of the electronic devices configured for operating as an input client, which includes information about a supportable input mode identical to an input mode supportable in the input server, and wherein when the input client is set, the control point collects a supportable input mode of an electronic device configured for operating as an input server, and sets as an input server at least one of the electronic devices configured for operating as an input server, which includes information about a supportable input mode identical to an input mode supportable in the input client.

14. The control point of claim 11, wherein the control point sets an input server by performing an input role setting action in which a data format of input data and transmission protocol information are included, wherein the control point receives, from the set input server a response message including an identifier (ID) of a session for transmitting input data and port information of a network for receiving the input data, and wherein the control point sets an input client by setting action which includes the ID of a session for transmitting the input data, the port information of a network for receiving the input data, protocol information for transmitting the input data, and information about a data format of the input data.

15. The control point of claim 11, wherein the control point sends to the input server an input mode request for requesting information about an input mode to be used during an input operation, receives this information about the input mode of the input server from the input server in response to the input mode request, activates an input mode of the input client based on the input mode information of the input server, receives input data with the activated input mode, and transmits the received input data to the input server.

16. The control point of claim 11, wherein when a current input mode is changed in the input server or the input client, the control point receives information about the changed input mode, acquires the changed input mode information from the device whose input mode is changed, and activates an input mode of a counterpart device of the device whose input mode is changed according to the acquired changed input mode information.

17. The control point of claim 11, wherein during activation of an input mode of a counterpart device, if there is a previously used session Identifier (ID), an input mode assigned the session ID is activated.

18. The control point of claim 11, wherein the set input client transmits received input data to the set input server using at least one of a UPnP protocol and a communication protocol other the UPnP protocol.

19. The control point of claim 11, wherein the input data received through the set input client includes at least one of a preset data format, a Universal Serial Bus (USB) report descriptor, and a hexadecimal InfraRed (IR) code value.

20. The control point of claim 11, wherein the input server comprises:
- a network transmission/reception module for receiving input data from the input client;
- a key code converter for analyzing the input data received through the network transmission/reception module, and converting the analyzed input data into key code information; and
- a key code processor for receiving the key code information from the key code converter and processing the received key code information.

21. The control point of claim 11, wherein the input client comprises:
- at least one input mode for receiving user input;
- an input signal transmission format converter for converting input data received through the input mode into an input signal to be transmitted to the input server; and
- a network transmission/reception module for transmitting the input data to the input server.

22. The control point of claim 21, wherein the input client further comprises a peripheral input device that is an additional input mode.

23. The control point of claim 11, wherein the control point sets a universal remote controller with an infrared transmitter as an input client, and sets as an input server a device that includes an infrared receiver and can be controlled by the universal remote controller.

24. The control point of claim 23, wherein the input client receives operation-code value mapping table information from the set input server.

* * * * *